United States Patent
Byun

(10) Patent No.: US 11,042,317 B2
(45) Date of Patent: Jun. 22, 2021

(54) MEMORY SYSTEM FOR REDUCING FRAGMENTATION BASED ON SEQUENTIAL INDEX AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 213 days.

(21) Appl. No.: 16/229,467

(22) Filed: Dec. 21, 2018

(65) Prior Publication Data

US 2020/0081646 A1  Mar. 12, 2020

(30) Foreign Application Priority Data

Sep. 10, 2018 (KR) .......................... 10-2018-0107821

(51) Int. Cl.
*G06F 3/06* (2006.01)
*G06F 12/02* (2006.01)

(52) U.S. Cl.
CPC ............ *G06F 3/0647* (2013.01); *G06F 3/061* (2013.01); *G06F 3/064* (2013.01); *G06F 3/0608* (2013.01); *G06F 3/0656* (2013.01); *G06F 3/0679* (2013.01); *G06F 12/0246* (2013.01); *G06F 2206/1004* (2013.01); *G06F 2212/7201* (2013.01)

(58) Field of Classification Search
CPC ........ G06F 3/0608; G06F 3/061; G06F 3/064; G06F 3/0647; G06F 3/0656; G06F 3/0679; G06F 12/0246; G06F 2206/1004; G06F 2212/7201

USPC ......................................... 711/165
See application file for complete search history.

(56) References Cited

U.S. PATENT DOCUMENTS

| | | | | |
|---|---|---|---|---|
| 6,330,654 B1* | 12/2001 | LaBerge | ............. | G06F 12/1027 711/207 |
| 8,762,627 B2* | 6/2014 | Sela | ..................... | G06F 12/0253 711/103 |
| 9,830,259 B2 | 11/2017 | Hada | | |
| 2011/0320415 A1* | 12/2011 | Berger | .............. | G06F 16/24552 707/692 |
| 2015/0081967 A1* | 3/2015 | Pan | ......................... | G06F 3/061 711/114 |

(Continued)

*Primary Examiner* — Reginald G Bragdon
*Assistant Examiner* — Aaron D Ho
(74) *Attorney, Agent, or Firm* — IP & T Group LLP

(57) ABSTRACT

A memory system includes a memory device including a first memory block and a second memory block; and a controller suitable for controlling the memory device, wherein the controller includes a sequential index calculator suitable for calculating a sequential index based on first logical block address (LBA) information and second LBA information that are written in the first memory block; an internal operation determining component suitable for determining whether an internal operation is to be performed on the first memory block, by comparing the sequential index of the first memory block with a threshold value; and an internal operation performing component suitable for migrating pieces of LBA information stored in the first memory block to the second memory block to rearrange the pieces of LBA information, when it is determined that the internal operation is to be performed on the first memory block.

20 Claims, 14 Drawing Sheets

(56) References Cited

U.S. PATENT DOCUMENTS

| | | | | |
|---|---|---|---|---|
| 2015/0169465 A1* | 6/2015 | Slepon | ................. | G06F 3/0659 |
| | | | | 711/103 |
| 2019/0220416 A1* | 7/2019 | Jung | ................. | G06F 12/1009 |
| 2019/0361628 A1* | 11/2019 | Yaromenka | ............ | G06F 3/064 |

* cited by examiner

MEMORY SYSTEM FOR REDUCING FRAGMENTATION BASED ON SEQUENTIAL INDEX AND OPERATING METHOD THEREOF

CROSS-REFERENCE TO RELATED APPLICATION

The present application claims priority under 35 U.S.C. § 119(a) to Korean Patent Application No. 10-2018-0107821, filed on Sep. 10, 2018, the disclosure of which is incorporated herein by reference in its entirety.

BACKGROUND

1. Field

Various embodiments of the present invention generally relate to a semiconductor device. Particularly, the embodiments relate to a memory system and an operating method thereof.

2. Description of the Related Art

Recently, the paradigm for the computer environment has shifted to ubiquitous computing, which allows computer systems to be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

A data storage device using a memory device provides advantages in that, since there is no mechanical driving part, stability and durability are excellent, information access speed is high and power consumption is low. Data storage devices having such advantages include a universal serial bus (USB) memory device, memory cards having various interfaces, and a solid state drive (SSD).

SUMMARY

Various embodiments are directed to a memory system for reducing fragmentation by performing an internal operation based on a sequential index according to a plurality of LBA patterns, and an operating method of the memory system.

In accordance with an embodiment, a memory system includes a memory device including a first memory block and a second memory block; and a controller suitable for controlling the memory device, wherein the controller includes a sequential index calculator suitable for calculating a sequential index based on first logical block address (LBA) information and second LBA information that are written in the first memory block; an internal operation determining component suitable for determining whether an internal operation is to be performed on the first memory block, by comparing the sequential index of the first memory block with a threshold value; and an internal operation performing component suitable for migrating pieces of LBA information stored in the first memory block to the second memory block to rearrange the pieces of LBA information, when it is determined that the internal operation is to be performed on the first memory block.

In accordance with an embodiment, an operating method of a memory system which includes a memory device that includes a first memory block and a second memory block, and a controller suitable for controlling the memory device, the operating method comprising: calculating a sequential index based on first logical block address (LBA) information and second LBA information that are written in the first memory block; determining whether an internal operation is to be performed on the first memory block, by comparing the sequential index of the first memory block with a threshold value; and migrating pieces of LBA information stored in the first memory block to the second memory block to rearrange the pieces of LBA information, when it is determined that the internal operation is to be performed on the first memory block.

In accordance with an embodiment, a memory system comprises a memory device including memory dies, each of which includes memory blocks; and a controller configured to control the memory device, the controller including a defragmentation manager configured to: calculate a sequential index indicative of a logical block address (LBA) access pattern for each of the memory blocks, compare each of the calculated sequential indexes with a threshold value, and perform an internal operation on a memory block having a sequential index less than or equal to the threshold value.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not to be construed as being limited to the embodiments set forth herein. Rather, the described embodiments are provided so that this disclosure is thorough and complete and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, the various embodiments of the present invention will be described in detail with reference to the attached drawings.

Figure 1:
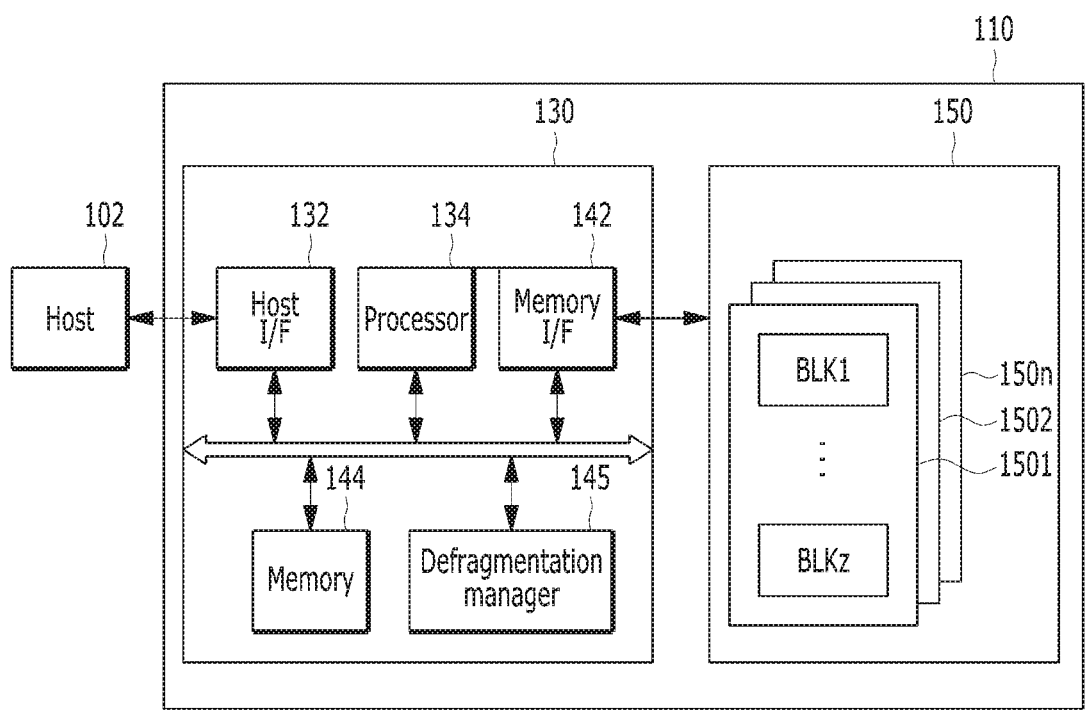
FIG. 1 is a block diagram schematically illustrating a data processing system including a memory system in accordance with an embodiment.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, portable electronic devices such as a mobile phone, an MP3 player and a laptop computer or electronic devices such as a desktop computer, a game machine, a television (TV) and a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150n.

The plurality of memory dies 1501 to 150n include a plurality of memory blocks BLK1 to BLKz, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks BLK1 to BLKz. In particular, the memory device 150 may include a plurality of memory dies 1501 to 150n, each of which includes a plurality of planes. The memory device 150 may be a nonvolatile memory device, for example, a flash memory. The flash memory may have a three-dimensional (3D) stack structure.

Detailed description of the structure of the memory device 150 including the 3D stack structure is given below with reference to FIGS. 2 to 4.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface (I/F) 132, a processor 134, a memory interface (I/F) 142, a memory 144 and a defragmentation manager 145.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (DATA), small computer system interface (SCSI), enhanced small disk interface (ESDI), integrated drive electronics (IDE) and mobile industry processor interface (MIDI). The host interface 32 may be driven through firmware referred to as a host interface layer (HIL), which is a region which exchanges data with the host 102.

The memory interface 142 serves as a memory and storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, as a NAND flash controller (NEC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through firmware referred to as a flash interface layer (FIL), which is a region which exchanges data with the memory device 150.

The memory 144, as the working memory of the memory system 110 and the controller 130, stores data for driving of the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM).

Furthermore, the memory 144 may disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data needed to perform data read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls the entire operations of the memory system 110, and in particular, controls a program operation or a read operation for the memory device 150, in response to a write request or a read request from the host 102. The processor 134 drives a firmware referred to as a flash translation layer (FTL), to control the general operations of the memory system 110. The processor 134 may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102, for example, a program operation corresponding to a write command, a read operation corresponding to a read command, an erase operation corresponding to an erase command or a parameter set operation corresponding to a set parameter command or a set feature command as a set command.

The controller 130 may also perform a background operation for the memory device 150, through the processor 134 embodied by a microprocessor or a central processing unit (CPU). The background operation includes an operation of copying the data stored in one memory block, among the memory blocks BLK1 to BLKz of the memory device 150, to another memory block. Such a background operation may be a garbage collection (GC) operation, an operation of swapping select memory blocks BLK1 to BLKz or data stored therein, e.g., a wear leveling (WL) operation, an operation of storing map data stored in the controller 130 in the memory blocks BLK1 to BLKz, e.g., a map flush operation, or an operation of performing bad block management for the memory device 150, for example, an operation of identifying and processing a bad block among the memory blocks BLK1 to BLKz in the memory device 150.

The processor 134 may drive the defragmentation manager 145. That is, the defragmentation manager 145 may be driven by the processor 134. Before describing the defragmentation manager 145, it is noted that, in general, the write or read performance of the controller 130 may be considerably degraded since the increase in throughput of an operation corresponding to a command received from the host 102, for example, a write or read operation corresponding to a write or read command intensifies the fragmentation of a logical block address (LBA) included in each block. In order to solve this concern, the defragmentation manager 145 calculates sequential indexes of the plurality of memory blocks. In addition, the defragmentation manager 145 compares the sequential indexes of the plurality of memory blocks with a threshold value Th, and performs an internal operation on a memory block having a sequential index less than or equal to the threshold value. In this regard, the defragmentation manager 145 will be described in detail with reference to FIGS. 2A to 2C.

According to embodiments, there is provided a memory system which includes one or more processors and one or more storage devices including program commands, while interworking with a host. For example, the one or more processors and the one or more storage devices including program commands may be implemented with the memory 144 and processor 134 included in the controller 130.

Figure 2A:
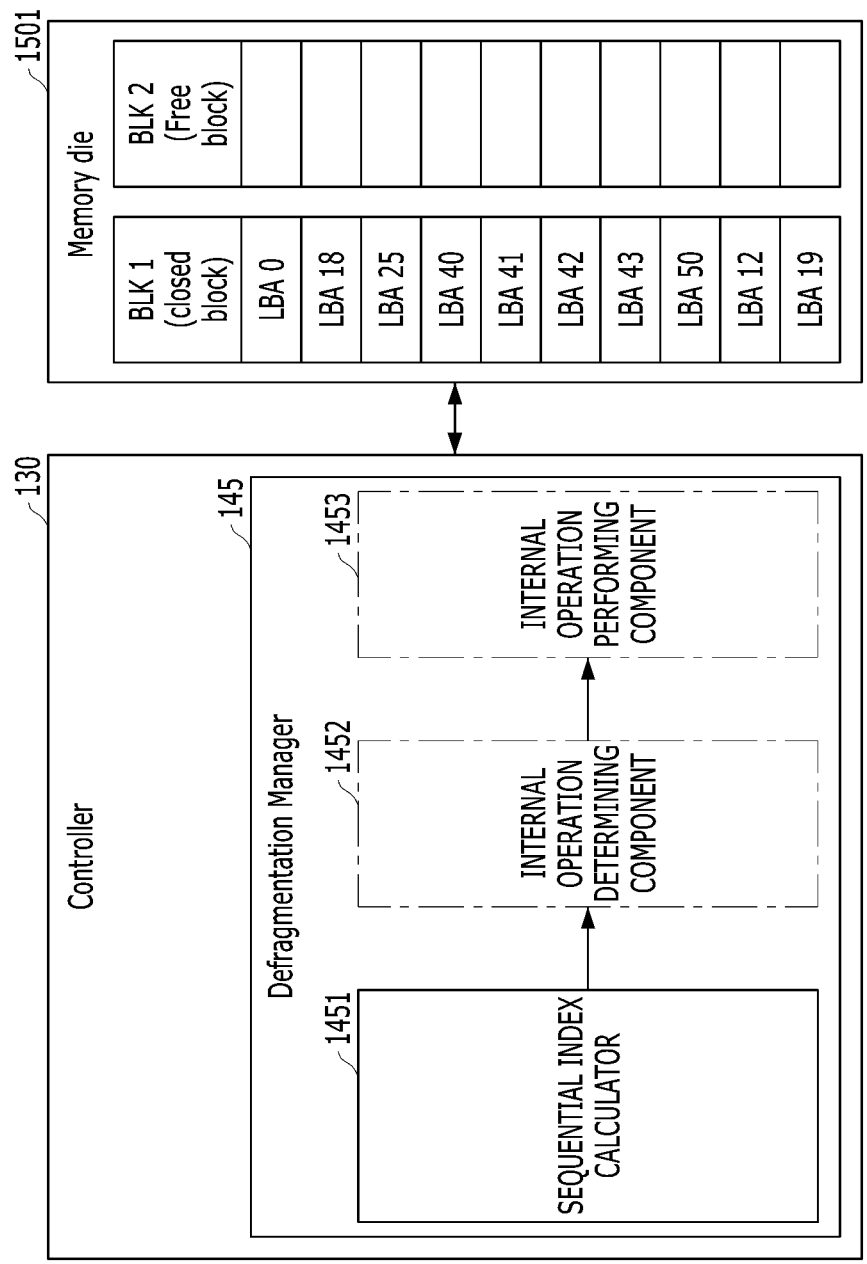
FIGS. 2A to 2C are diagrams schematically illustrating a data processing operation to a memory device in a memory system in accordance with an embodiment.
Figure 2B:
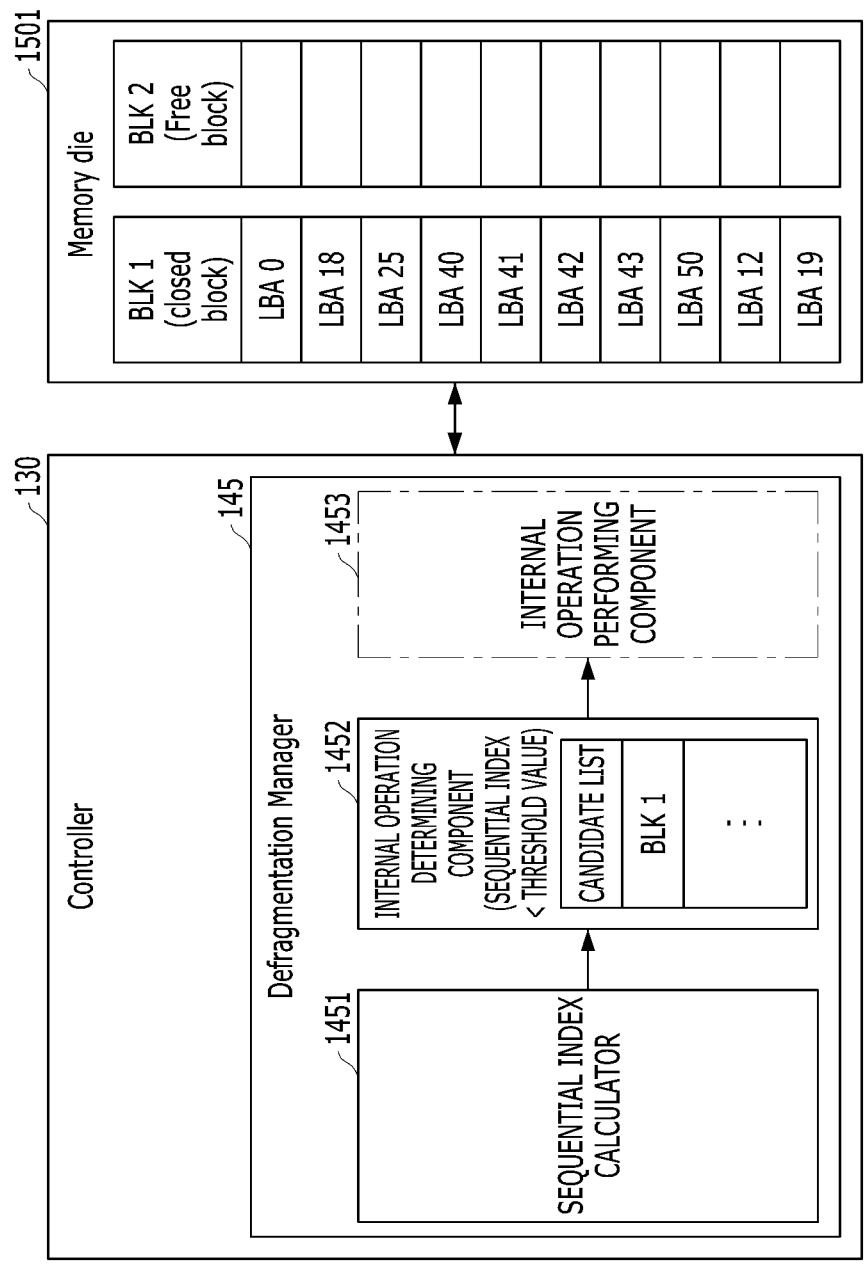
Figure 2C:
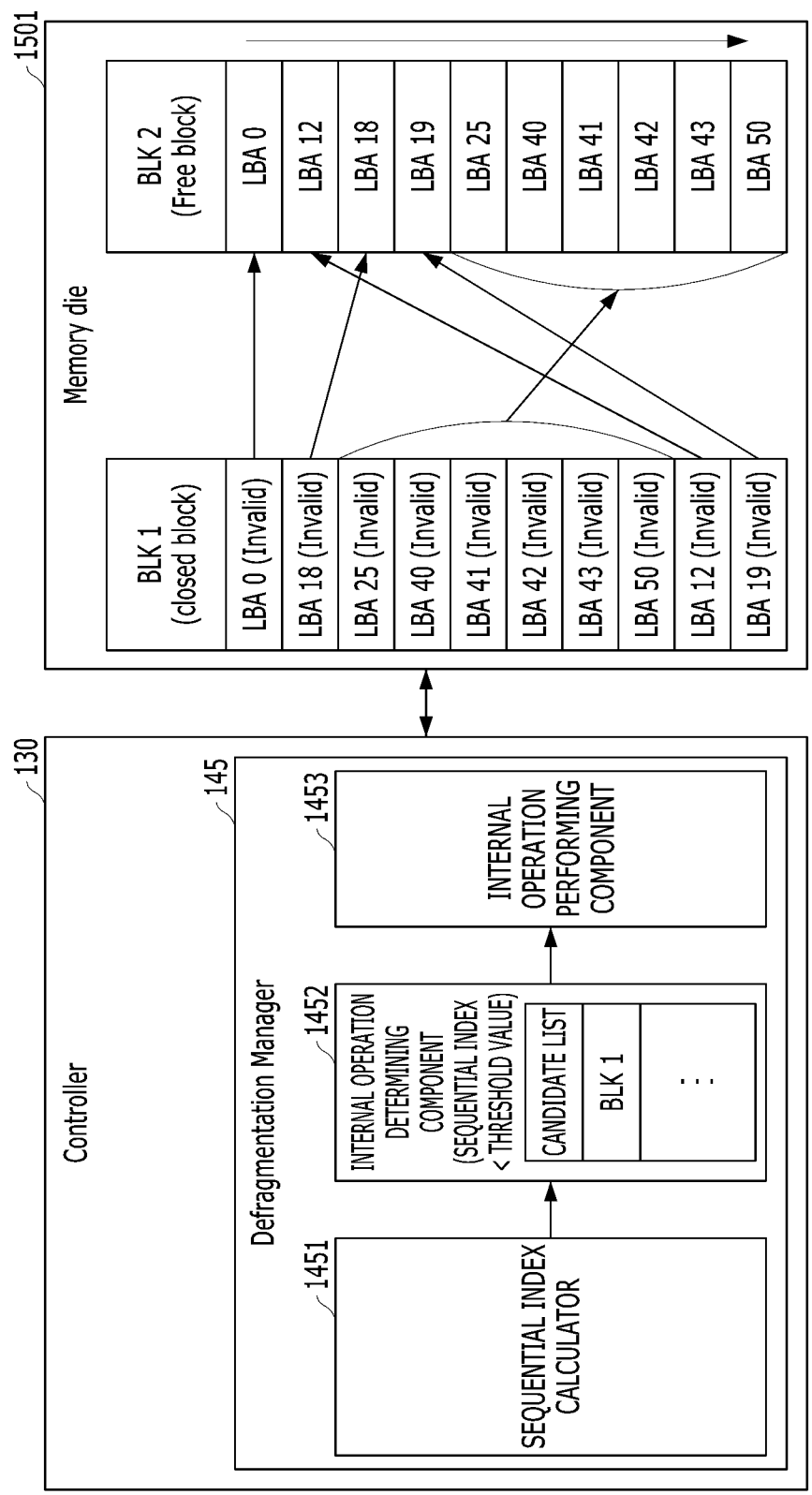

FIGS. 2A to 2C are diagrams illustrating an example of a data processing operation on the memory device in the memory system in accordance with an embodiment.

Referring to FIGS. 2A to 2C, the defragmentation manager 145 may include a sequential index calculator 1451, an internal operation determining component 1452 and an internal operation performing component 1453.

Referring to FIG. 2A, whenever the controller 130 performs a command operation in response to a command received from the host 102, for example, an operation of writing data to the first memory block BLK1 in response to a write command, or when LBA information is written to all the pages included in the first memory block BLK1, the sequential index calculator 1451 calculates a sequential index of the first memory block BLK1. For example, the sequential index calculator 1451 may calculate the sequential index whenever the LBA information is written to the first memory block BLK1, and store the sequential index in a sequential index list (not shown) included in the memory 144. Specifically, when the first memory block BLK1 is an open block, the sequential index calculator 1451 may reset the sequential index of the first memory block BLK1 to '0'. Whenever the LBA information is written to the first memory block BLK1, the sequential index calculator 1451 determines an LBA access pattern of first LBA information and second LBA information which has been previously written. The first LBA information refers to the LBA information currently written in the first memory block BLK1, and the second LBA information refers to the LBA information written before the first LBA information is written to the first memory block BLK1. For convenience in description, the first LBA information is referred to as "current LBA information", and the second LBA information is referred to as "previous LBA information". In addition, the LBA information may be mapped to a physical address indicating any one page of a memory block, and a L2P table related thereto may be managed in the memory 144 of the controller 130.

The sequential index calculator 1451 may determine the LBA access pattern based on the difference between the current LBA information and the previous LBA information. For example, when the difference between the current LBA information and the previous LBA information is '1', the sequential index calculator 1451 determines the LBA access pattern to be a sequential pattern, and increases the sequential index by (1++). On the other hand, when the difference between the current LBA information and the previous LBA information is not '1', the sequential index calculator 1451 determines the LBA access pattern as a random pattern, and does not increase the sequential index. For example, when LBA0 is first stored in the first memory block BLK1, the sequential index is '0'. When LBA18 is stored in the first memory block BLK1 after LBA0, the difference between LBA18 and LBA0 is greater than '1'. Accordingly, the sequential index calculator 1451 determines the LBA access pattern to be a random pattern, and does not increase the sequential index. On the other hand, when LBA41 is stored after LBA40 is stored in the first memory block BLK1, the difference between LBA41 and LBA40 is '1'. Accordingly, the sequential index calculator 1451 determines the LBA access pattern to be a sequential pattern, and increases the sequential index by (1++). In this manner, the sequential index calculator 1451 may determine the LBA access pattern of the first memory block BLK1, and calculate the sequential index until the LBA information is stored in all the pages in the first memory block BLK1. When the LBA information is stored in all the pages in the first memory block BLK1, the controller 130 may designate the first memory block BLK1 as a closed block, and store the sequential index of the first memory block BLK1 in the sequential index list in the memory 144. For example, the controller 130 may store the sequential index '3' of the first memory block BLK1 in the sequential index list of the memory 144.

Subsequently, the internal operation determining component 1452, which is described with reference to FIG. 6B, may determine whether to perform an internal operation based on the sequential index of the first memory block BLK1.

Referring to FIG. 2B, the internal operation determining component 1452 may compare the sequential index of the first memory block BLK1 stored in the sequential index list with the threshold value, and determine whether to perform an internal operation on the first memory block BLK1. In other words, when the comparison result between the sequential index of the first memory block BLK1 and the threshold value indicates that the sequential index of the first memory block BLK1 is greater than the threshold value, the internal operation determining component 1452 determines that the pieces of LBA information stored in the first memory block BLK1 are sequentially arranged and the internal operation does not need to be performed.

On the other hand, when the comparison result indicates that the sequential index of the first memory block BLK1 is less than the threshold value, the internal operation determining component 1452 determines that the pieces of LBA information are randomly stored in the first memory block BLK1, and stores an indication of memory blocks, on which the internal operation has to be performed, in a candidate list. For example, when the threshold value is '6', the sequential index of the first memory block BLK1 is '3'. Accordingly, the internal operation determining component 1452 determines that the LBA fragmentation of the first memory block BLK1 has occurred, and thus determines that the internal operation has to be performed through the internal operation performing component 1453.

Referring to FIG. 2C, the internal operation performing component 1453 checks the memory blocks stored in the candidate list. For example, the internal operation performing component 1453 may check the first memory block BLK1 from the candidate list. The internal operation performing component 1453 may read pieces of LBA information in the checked first memory block BLK1 in ascending order of LBA information, and migrate the pieces of LBA information to a free block, in order to sequentially rearrange and store the pieces of LBA information. For example, the internal operation performing component 1453 reads LBA0, which is the lowest LBA information among the pieces of LBA information included in the first memory block BLK1 checked from the candidate list, and migrate the lowest LBA information, i.e., LBA0, to a second memory block BLK2, which is a free block. Subsequently, the internal operation performing component 1453 reads LBA12, which is the lowest LBA information among the remaining pieces of LBA information in the first memory block BLK1, except for LBA0, and migrates the lowest LBA information, i.e., LBA12, to the second memory block BLK2. In this manner, the internal operation may be performed until there is no more LBA information to migrate from the first memory block BLK1 to the second memory block BLK2. Consequently, the pieces of LBA information may be sequentially rearranged and stored in the second memory block BLK2.

Figure 3:
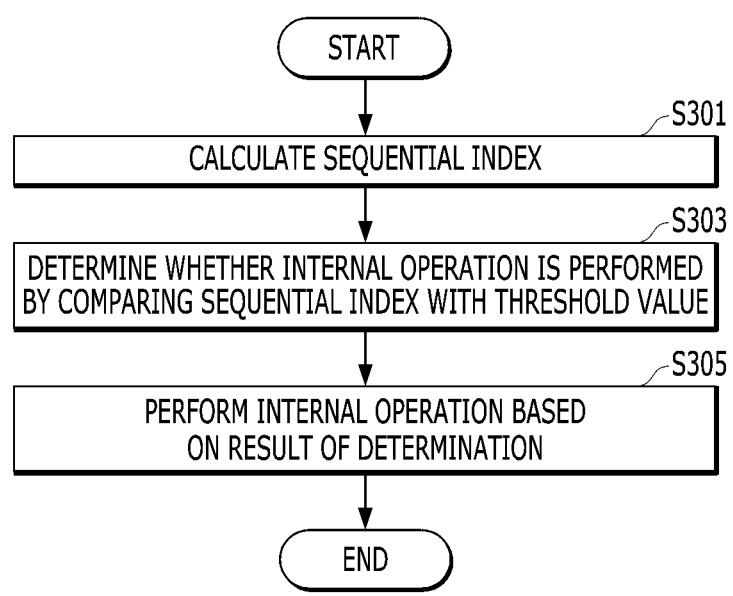
FIGS. 3 to 6 are flowcharts illustrating an operation of a memory system in accordance with an embodiment.

FIGS. 3 to 6 are flowcharts illustrating an operation of the memory system in accordance with an embodiment. FIG. 3 is a flowchart illustrating an operating method of the defragmentation manager in accordance with embodiments.

Referring to FIG. 3, the controller 130 may calculate the sequential index of the first memory block BLK1 whenever the controller 130 performs a command operation in response to a command received from the host 102, for example, an operation of writing data to the first memory block BLK1 in response to a write command, or when LBA information is written to all the pages included in the first memory block BLK1, in step S301. For example, whenever the LBA information is written to the first memory block BLK1, the controller 130 may calculate the sequential index of the first memory block BLK1 and store the sequential index in the sequential index list (not shown) included in the memory 144.

In step S303, the controller 130 compares the calculated sequential index with the set or predetermined threshold value, and determines whether the internal operation has to be performed on the first memory block BLK1.

When it is determined in step S303 that the internal operation has to be performed on the first memory block BLK1, the controller 130 may read pieces of LBA information stored in the first memory block BLK1, and migrate and store the pieces of LBA information into the second memory block BLK2, which is a free block, in step S305.

Figure 4:
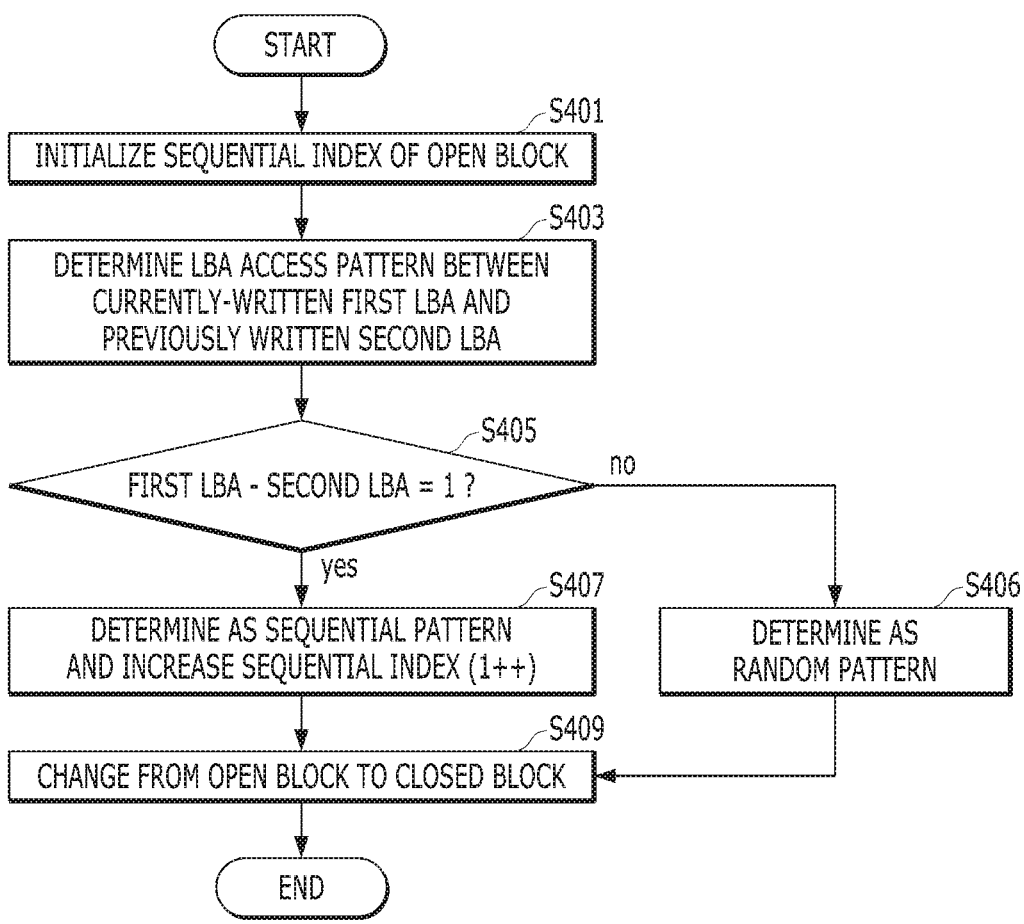

FIG. 4 is a flowchart illustrating a method of calculating the sequential index of a memory block in FIG. 3, in accordance with an embodiment.

Referring to FIG. 4, the controller 130 may reset the sequential index of the first memory block BLK1 to '0' when the first memory block BLK1 is an open block, in step S401. For example, when LBA0 is first stored in the first memory block BLK1, the sequential index is '0'.

In step S403, the controller 130 determines an LBA access pattern of first LBA information and second LBA information which has been previously written. The first LBA information refers to the LBA information currently written in the first memory block BLK1, and the second LBA information refers to the LBA information written before the first LBA information is written to the first memory block BLK1. For convenience in description, the first LBA information is referred to as "current LBA information", and the second LBA information is referred to as "previous LBA information".

In step S405, the controller 130 may determine whether the LBA access pattern of the LBA information stored in the first memory block BLK1 is a sequential pattern or a random pattern, based on the difference between the current LBA information and the previous LBA information. For example, the controller 130 may determine whether the difference between the current LBA information and the previous LBA information is '1', in order to determine whether the LBA access pattern is the sequential pattern or the random pattern.

When the difference between the current LBA information and the previous LBA information is not '1' (that is, "no" in step S405), the controller 130 determines that the pattern of the current LBA information and the previous LBA information is a random pattern, and does not increase the sequential index in step S406. For example, when LBA18 is stored in the first memory block BLK1 after LBA0, the controller 130 determines that the pattern of LBA18 and LBA0 is a random pattern since the difference between LBA18 and LBA0 is greater than '1', and does not increase the sequential index.

On the other hand, when the difference between the current LBA information and the previous LBA information is '1' (that is, "yes" in step S405), the controller 130 determines that the pattern of the current LBA information and the previous LBA information is a sequential pattern, and increases the sequential index by (1++) in step S407. For example, when LBA41 is stored after LBA40 is stored in the first memory block BLK1, the controller 130 determines that the pattern of LBA41 and LBA40 is a sequential pattern since the difference between LBA18 and LBA0 is '1', and increases the sequential index by (1++). In this manner, the controller 130 may calculate the sequential index by determining the LBA access pattern of the first memory block BLK1 until the LBA information is stored in all the pages included in the first memory block BLK1. In step S409, when the LBA information is stored in all the pages included in the first memory block BLK1, the controller 130 may change the first memory block BLK1 to a closed block, and store the sequential index of the first memory block BLK1 in the sequential index list included in the memory 144. For example, the controller 130 may store the sequential index '3' of the first memory block BLK1 in the sequential index list of the memory 144.

Figure 5:
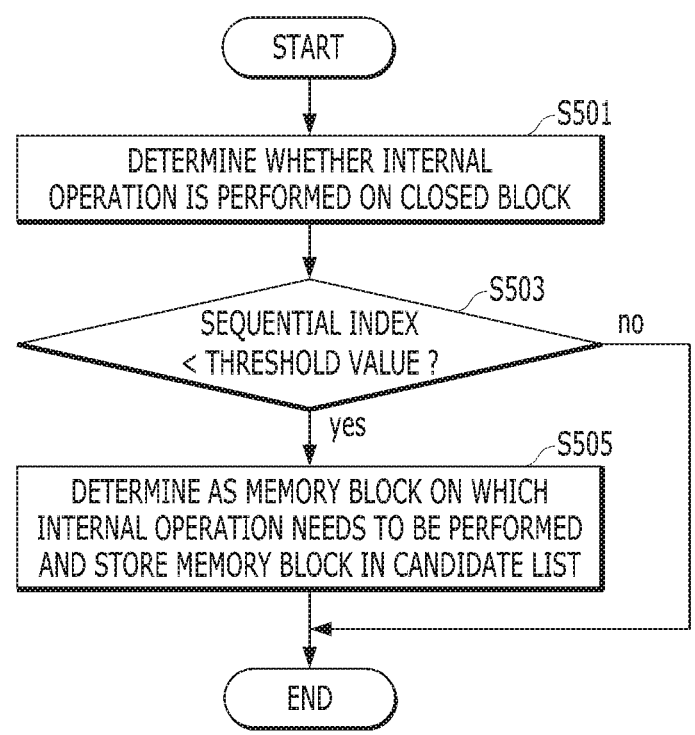

FIG. 5 is a flowchart illustrating a method of determining whether to perform an internal operation based on a comparison result between the sequential index of a memory block in FIG. 3 and a threshold value in accordance with an embodiment.

Referring to FIG. 5, the controller 130 checks the sequential index of the first memory block BLK1 as a closed block, which is stored in the sequential index list, and determines whether to perform an internal operation, in step S501.

In step S503, the controller 130 compares the sequential index of the first memory block BLK1 with the threshold value.

When the comparison result between the sequential index of the first memory block BLK1 and the threshold value indicates that the sequential index of the first memory block BLK1 is greater than the threshold value (that is, "no" in step S503), the controller 130 determines that the pieces of LBA information stored in the first memory block BLK1 are sequentially arranged and the internal operation does not need to be performed.

On the other hand, when the comparison result between the sequential index of the first memory block BLK1 and the threshold value indicates that the sequential index of the first memory block BLK1 is less than the threshold value (that is, "yes" in step S503), the controller 130 determines that the pieces of LBA information are randomly stored in the first memory block BLK1, and stores memory blocks on which the internal operation has to be performed, in candidate list in step S505. For example, when the threshold value is '6', the controller 130 determines that the LBA fragmentation of the first memory block BLK1 has occurred, because the sequential index of the first memory block BLK1 is '3'. Thus, the controller 130 determines that the internal operation has to be performed.

Figure 6:
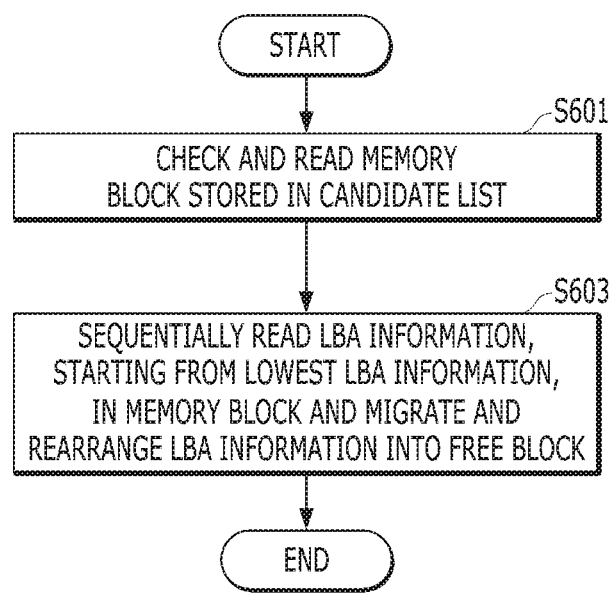

FIG. 6 is a flowchart illustrating a method of performing an internal operation in accordance with an embodiment.

Referring to FIG. 6, the controller 130 checks the memory blocks stored in the candidate list in step S6001. For example, the controller 130 checks the first memory block BLK1 from the candidate list.

In step S6003, the controller 130 reads the lowest LBA information among the pieces of LBA information included in the first memory block, and migrates the LBA information to a free block. By migrating the pieces of LBA information stored in the first memory block to the free block in ascending order of LBA information, the pieces of LBA information may be sequentially rearranged in the free block. For example, the controller 130 reads LBA0, which is the lowest LBA information among the pieces of LBA information included in the first memory block BLK1 checked from the candidate list, and migrates the lowest LBA information, i.e., LBA0, to a second memory block BLK2, which is a free block. Subsequently, the controller 130 reads LBA12, which is the lowest LBA information among the remaining pieces of LBA information in the first memory block BLK1, except for LBA0, and migrates the lowest LBA information, i.e., LBA12, to the second memory block BLK2 k. In this manner, the migration operation may be performed until there is no more LBA information to migrate from the first memory block BLK1 to the second memory block BLK2. Consequently, the pieces of LBA information may be sequentially rearranged and stored in the second memory block BLK2.

The present embodiments may be applied to a super memory block.

Figure 7:
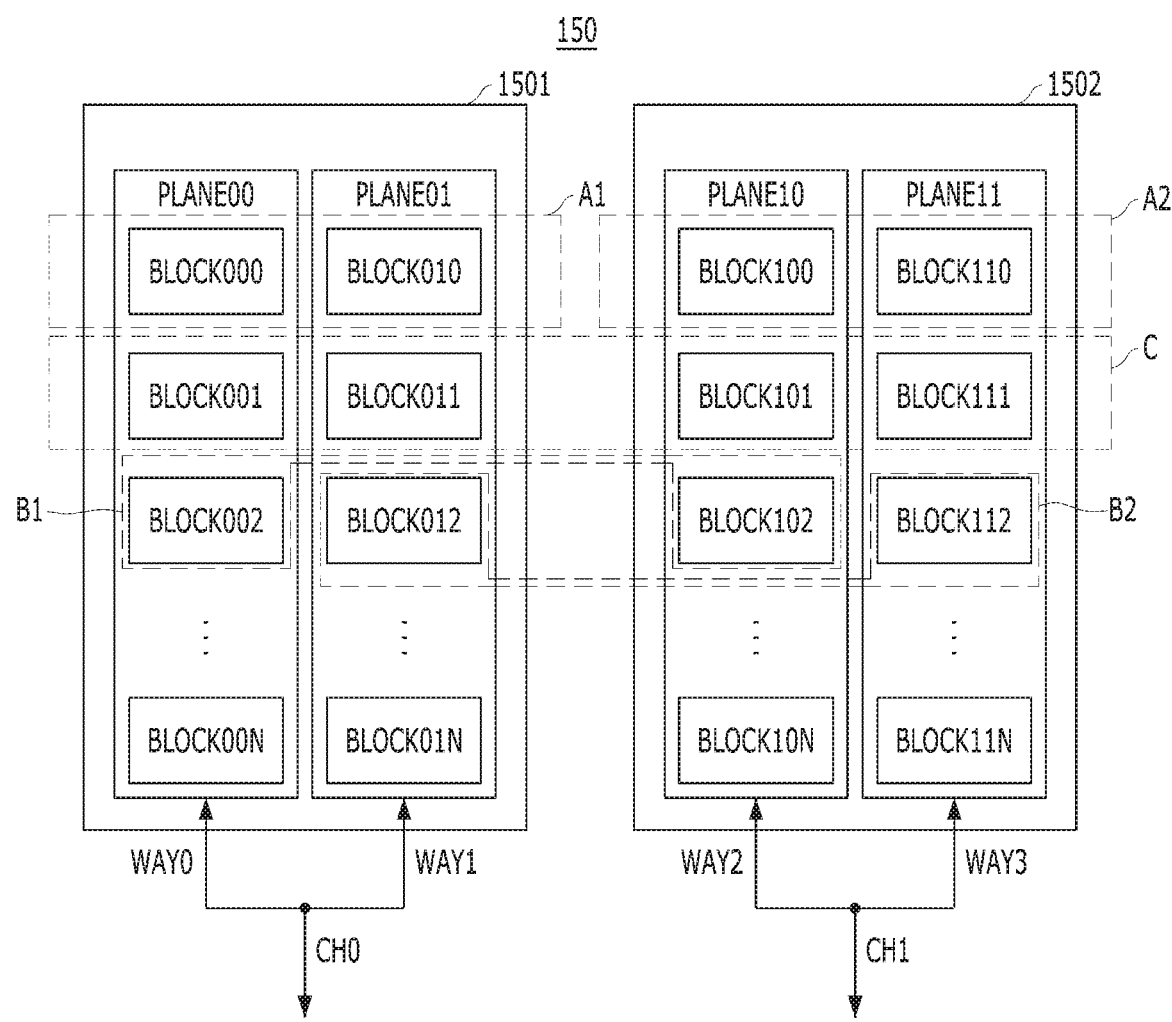
FIG. 7 is a diagram schematically illustrating a super memory block used in a memory system in accordance with an embodiment.

FIG. 7 is a diagram for describing the concept of a super memory block used in a memory system in accordance with an embodiment.

FIG. 7 illustrates a plurality of memory dies 1501 to 150$n$ included in the memory device 150 among the components of the memory system 110, in accordance with the embodiment of FIG. For example, the memory device 150 may include a first memory die 1501 and a second memory die 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of blocks. For example, the first plane PLANE00 may include first to $N^{th}$ memory blocks BLOCK000 to BLCOK00N, and the second plane PLANE01 may include first to $N^{th}$ memory blocks BLOCK010 to BLCOK01N. The third plane PLANE10 may include first to $N^{th}$ memory blocks BLOCK100 to BLCOK10N, and the fourth plane PLANE11 may include first to $N^{th}$ memory blocks BLOCK110 to BLCOK11N.

The first memory die 1501 is capable of inputting/outputting data through a zeroth channel CH0, and the second memory die 1502 is capable of inputting/outputting data through a first channel CH1. The zeroth channel CH0 and the first channel CH1 may input/output data in an interleaving scheme.

The first memory die 1501 includes the plurality of planes PLANE00 and PLANE01 corresponding to a plurality of ways WAY0 and WAY1, respectively, capable of inputting/outputting data in the interleaving scheme by sharing the zeroth channel CH0.

The second memory die 1502 includes the plurality of planes PLANE10 and PLANE11 corresponding to a plurality of ways WAY2 and WAY3, respectively, capable of inputting/outputting data in the interleaving scheme by sharing the first channel CH1.

The plurality of memory blocks in the memory device 150 may be divided into groups based on physical locations where the same way or channel is used.

More or less than two memory dies may be included in the memory device 150, and more or less than two planes may be included in each of the memory dies, according to a designer's selection. In addition, a set or predetermined number of memory blocks included in each of the planes may be also adjusted according to a designer's selection.

The controller 130 may group memory blocks which can be selected simultaneously, among the plurality of memory blocks which are divided into different dies or different planes based on their physical locations, and manage the memory block groups as super memory blocks.

The scheme in which the controller 130 divides the memory blocks into super memory blocks and manages the super memory blocks may be performed in various ways according to a designer's selection. Three exemplary schemes will be described below.

A first scheme is that the controller 130 groups an arbitrary memory block BLOCK000 of the first plane PLANE00 and an arbitrary memory block BLOCK010 of the second plane PLANE01 in the first memory die 1501 of the plurality of memory dies 1501 and 1502 in the memory device 150, and manages the grouped memory blocks BLOCK000 and BLOCK010 as a single super memory block A1. When the first scheme is applied to the second memory die 1502 in the memory device 150, the controller 130 may group an arbitrary memory block BLOCK100 of the first plane PLANE10 and an arbitrary memory block BLOCK110 of the second plane PLANE11 in the second memory die 1502, and manage the grouped memory blocks BLOCK100 and BLOCK110 as a single super memory block A2.

A second scheme is that the controller 130 groups an arbitrary memory block BLOCK002 in the first plane PLANE00 of the first memory die 1501 and an arbitrary memory block BLOCK102 in the first plane PLANE10 of the second memory die 1502, and manages the grouped memory blocks BLOCK002 and BLOCK102 as a single super memory block B1. In addition, according to the second scheme, the controller 130 may group an arbitrary memory block BLOCK012 in the second plane PLANE01 of the first memory die 1501 and an arbitrary memory block BLOCK112 in the second plane PLANE11 of the second memory die 1502, and manage the grouped memory blocks BLOCK012 and BLOCK112 as a single super memory block B2.

A third scheme is that the controller 130 groups an arbitrary memory block BLOCK001 in the first plane PLANE00 of the first memory die 1501, an arbitrary memory block BLOCK011 included in the second plane PLANE01 of the first memory die 1501, an arbitrary memory block BLOCK101 in the first plane PLANE10 of the second memory die 1502, and an arbitrary memory block BLOCK111 in the second plane PLANE11 of the second memory die 1502, and manages the grouped memory blocks BLOCK001, BLOCK011, BLOCK101 and BLOCK111 as a single super memory block C.

Accordingly, simultaneously-selectable memory blocks included in each of the super memory blocks may be substantially simultaneously selected through the interleaving scheme, for example, a channel interleaving scheme, a memory die interleaving scheme, a memory chip interleaving scheme or a way interleaving scheme.

With reference to FIGS. 8 to 16, a data processing system and electronic appliances, to which the memory system 110 including the memory device 150 and the controller 130 described above, may be applied, in accordance with embodiments, are described.

Figure 8:
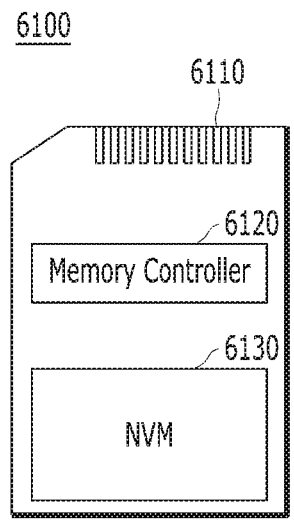
FIGS. 8 to 16 are diagrams schematically illustrating application examples of a data processing system including a memory system in accordance with various embodiments.

FIG. 8 is a diagram illustrating a data processing system including a memory system in accordance with an embodiment. FIG. 8 illustrates a memory card system 6100 to which the memory system is applied.

Referring to FIG. 8, the memory card system 6100 includes a connector 6110, a memory controller 6120 and a memory device 6130.

The memory controller 6120 is connected with, for access to, the memory device 6130, which is implemented as a nonvolatile memory (NVM. For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 9:
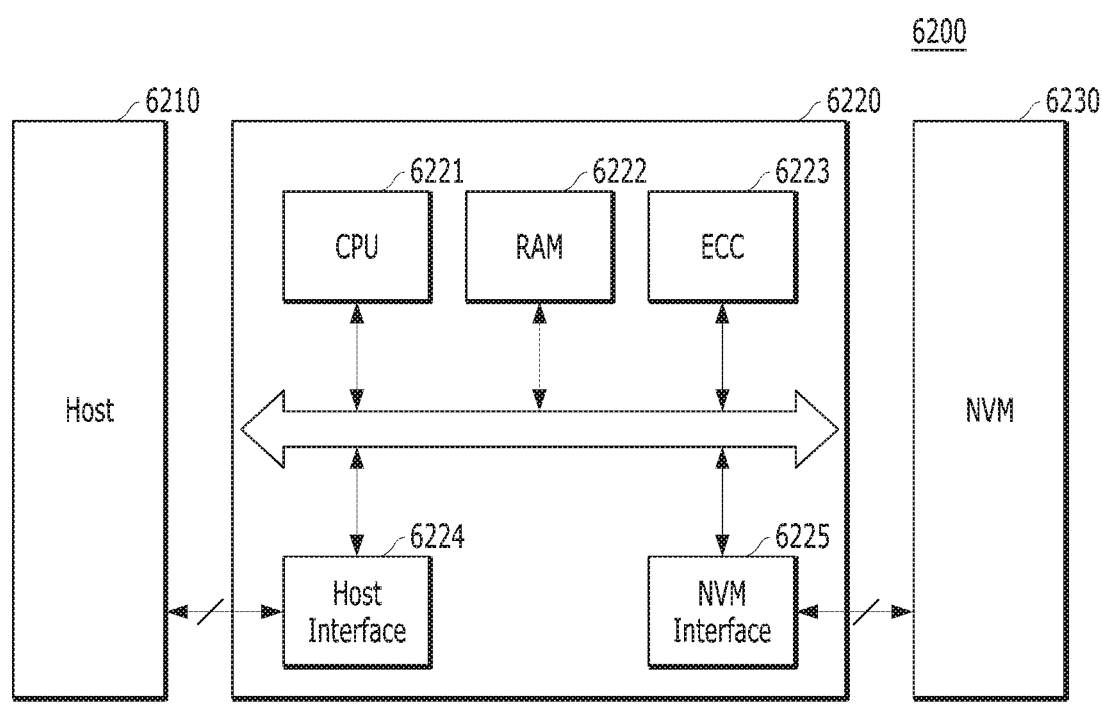

FIG. 9 is a diagram illustrating a data processing system 6200 including a memory system in accordance with an embodiment.

Referring to FIG. 9, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 of a low speed to operate at a high speed.

The ECC circuit 6223 corresponds to the ECC component 138 of the controller 130 described above with reference to FIG. 1. As described above with reference to FIG. 1, the ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using any of various coded modulations such as an LDPC code, a BCH code, a turbo code, a Reed-Solomon code, a convolution code, an RSC, a TCM and a BCM.

The memory controller 6220 transmits and receives data to and from the host 6210 through the host interface 6224, and transmits and receives data to and from the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or other external device. Specifically, as the memory controller 6220 is configured to communicate with an external device through at least one among various communication protocols, the memory system and the data processing system may be applied to wired and/or wireless electronic appliances, particularly a mobile electronic appliance.

Figure 10:
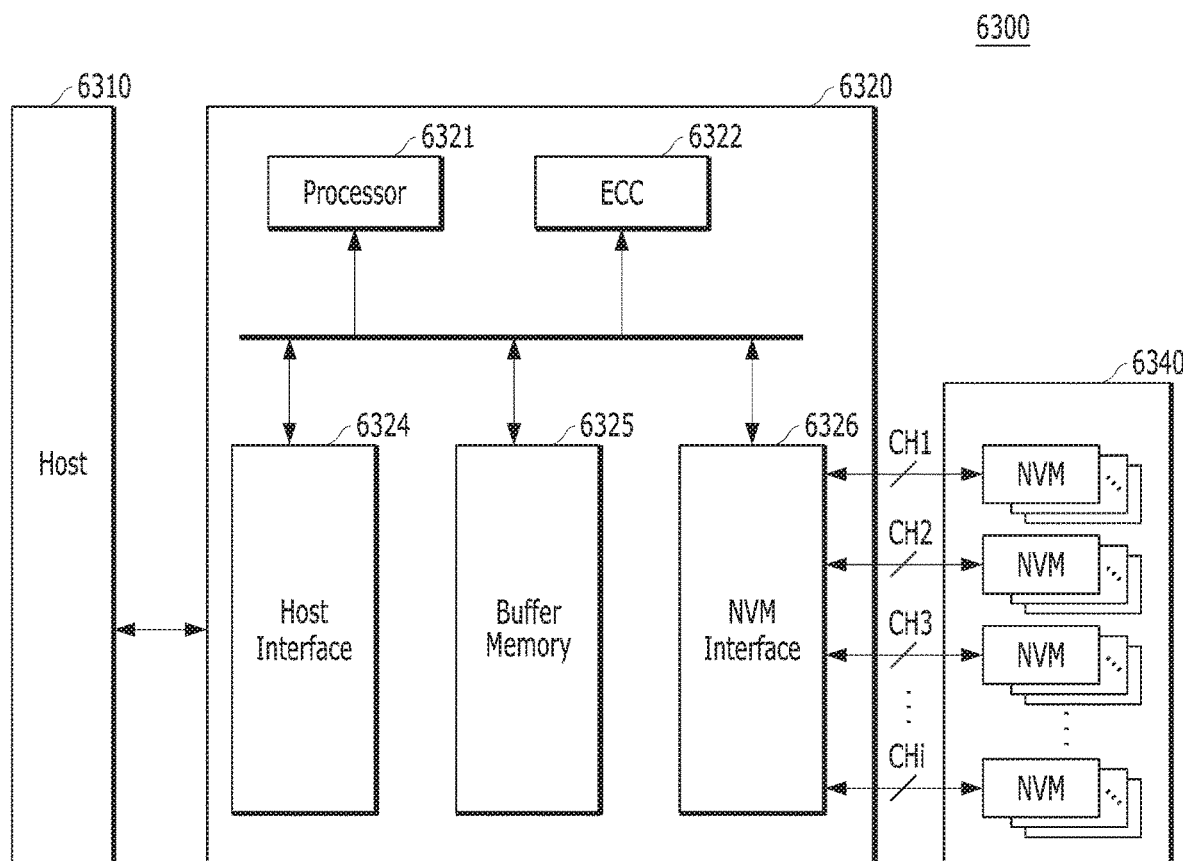

FIG. 10 is a diagram illustrating a data processing system including a memory system in accordance with an embodiment. FIG. 10 illustrates a solid state drive (SSD) 6300 to which the memory system is applied.

Referring to FIG. 10, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, ... and CHi. The controller 6320 includes at least one processor 6321, an ECC circuit 6322, a host interface 6324, a buffer memory 6325, and a memory interface, for example, a nonvolatile memory (NVM) interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM or a nonvolatile memory such as, but not limited to, an FRAM, an ReRAM, an STT-MRAM and a PRAM. While it is illustrated in FIG. 10 that the buffer memory 6325 is disposed within the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, ... and CHi.

Using a plurality of SSDs 6300, to each of which the memory system 110 is applied, a data processing system, for example, a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 11:
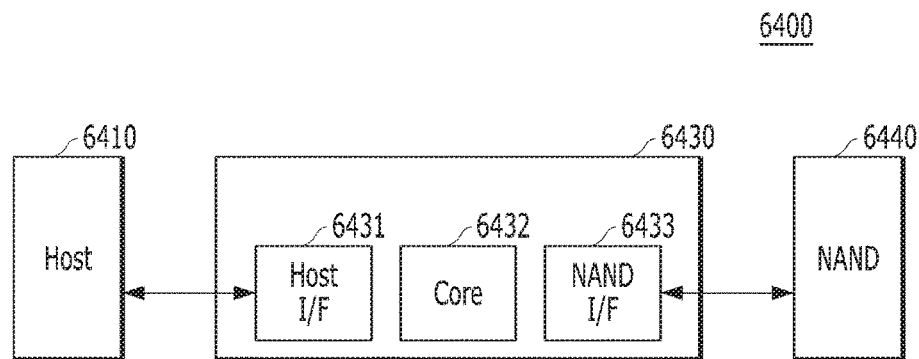

FIG. 11 is a diagram illustrating a data processing system including a memory system in accordance with an embodiment. FIG. 11 illustrates an embedded multimedia card (eMMC) 6400 to which the memory system is applied.

Referring to FIG. 11, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, and may be a serial interface, for example, a ultra high speed (UHS)-I/UHS-II and a UFS interface.

FIGS. 12 to 15 are diagrams illustrating examples of data processing systems including a memory system in accordance with embodiments. Each of FIGS. 12 to 15 illustrates a universal flash storage (UFS) to which the memory system is applied.

Referring to FIGS. 12 to 15, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the likes, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 9 to 11, and the UFS cards 6530, 6630, 6730 and 6830 may be implemented in the form of the memory card system 6100 described above with reference to FIG. 8.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, various card protocols such as universal storage bus (USB) Flash Drives (UFDs), multi-media card (MMC), secure digital (SD), mini SD and/or Micro SD.

Figure 12:
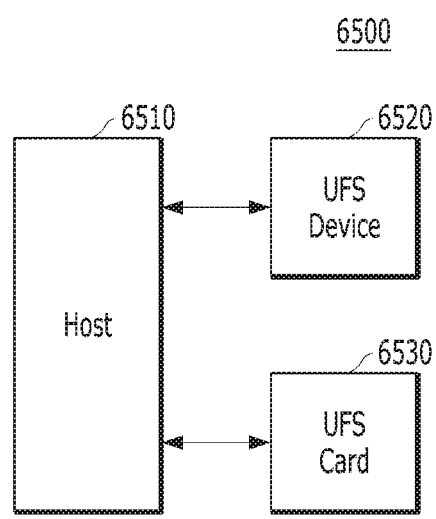

In the UFS system 6500 shown in FIG. 12, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

Figure 13:
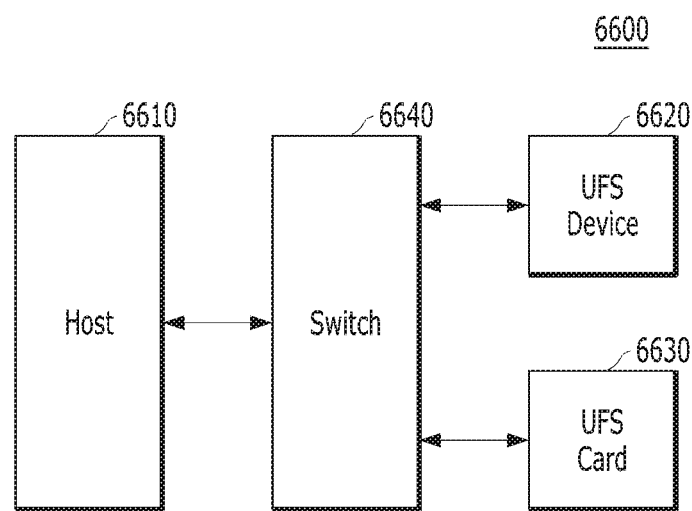

In the UFS system 6600 shown in FIG. 13, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 14:
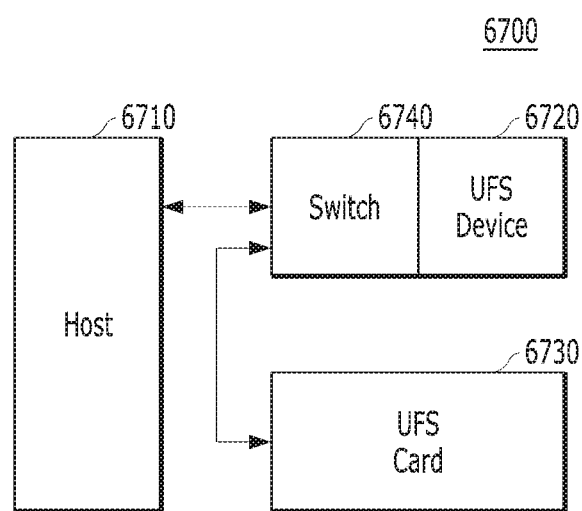

In the UFS system 6700 shown in FIG. 14, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 15:
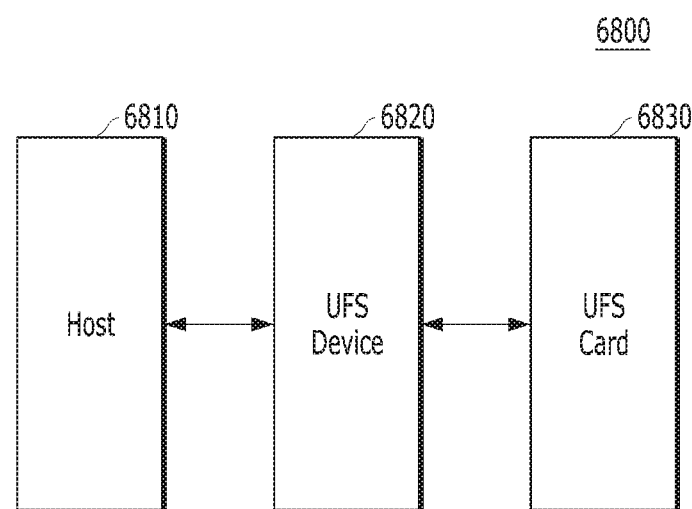

In the UFS system 6800 shown in FIG. 15, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 16:
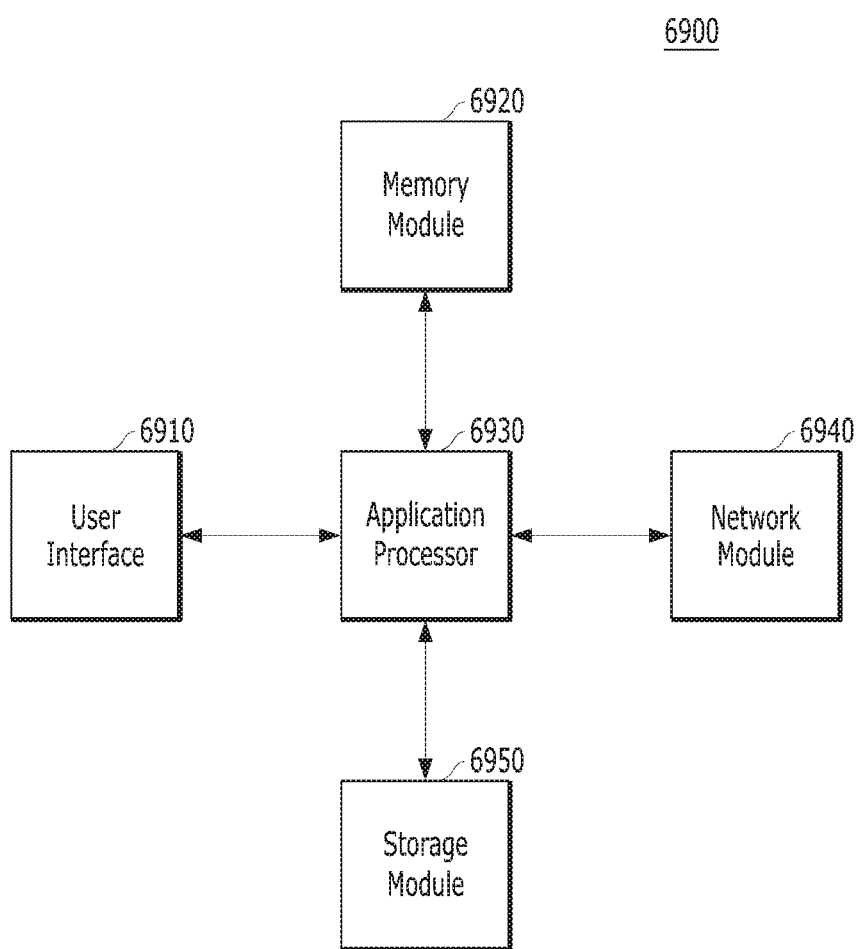

FIG. 16 is a diagram illustrating a data processing system including a memory system in accordance with an embodiment. FIG. 16 illustrates a user system 6900 to which the memory system is applied.

Referring to FIG. 16, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For example, the application processor 6930 and the memory module 6920 may be mounted by being packaged on the basis of a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. As a result, the memory system and the data processing system may be applied to wired and/or wireless electronic appliances. The network module 6940 may be included in the application processor 6930.

The storage module 6950 may store data, for example, data received from the application processor 6930, and transmit data stored therein, to the application processor 6930. The storage module 6950 may be implemented by a nonvolatile memory such as a phase-change RAM (PRAM), a magnetic RAM (MRAM), a resistive RAM (ReRAM), a NAND flash memory, a NOR flash memory and/or a 3-dimensional NAND flash memory. Also, the storage module 6900 may be provided as a removable storage medium such as a memory card of the user system 6900 and an external drive. That is to say, the storage module 6950 may correspond to the memory system 110 described above with reference to FIG. 1, and may be implemented as the SSD, eMMC and UFS described above.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

According to embodiments of the present invention, a data processing system and a method for operating the data processing system may have minimal or low complexity and performance deterioration by efficiently synchronizing a NAND mapping table included in a memory device with a host mapping table included in a host.

In accordance with embodiments of the invention, a plurality of logical block addresses may be rearranged through a sequential index calculated based on pieces of sequential logical block address information, thereby reducing the fragmentation of the logical block addresses.

While the present invention has been illustrated and described with respect to specific embodiments, it will be apparent to those skilled in the art in light of the foregoing description that various changes and modifications may be made without departing from the spirit and scope of the invention as defined in the following claims.

What is claimed is:

1. A memory system comprising:
   a memory device including a first memory block and a second memory block; and
   a controller suitable for controlling the memory device, wherein the controller includes:
   a sequential index calculator suitable for calculating a sequential index based on first logical block address (LBA) information and second LBA information that are written in the first memory block;
   an internal operation determining component suitable for determining whether an internal operation is to be performed on the first memory block, by comparing the sequential index of the first memory block with a threshold value; and
   an internal operation performing component suitable for migrating pieces of LBA information stored in the first memory block to the second memory block to rearrange the pieces of LBA information, when it is determined that the internal operation is to be performed on the first memory block,
   wherein the internal operation performing component performs the internal operation when the comparison result indicates that the sequential index of the first memory block is less than the threshold value, and does not perform the internal operation when the comparison result indicates that the sequential index of the first memory block is equal to or greater than the threshold value.

2. The memory system of claim 1, wherein the first LBA information indicates information that is currently written in the first memory block.

3. The memory system of claim 1, wherein the second LBA information indicates information that is written before the first LBA information is written to the first memory block.

4. The memory system of claim 1, wherein the sequential index calculator determines an LBA access pattern based on the first and second LBA information written in the first memory block.

5. The memory system of claim 4, wherein when the determined LBA access pattern indicates that a difference between the first LBA information and the second LBA information is a first value, the sequential index calculator determines that the LBA access pattern of the first LBA information and the second LBA information is a sequential pattern, and increases the sequential index by a set unit value.

6. The memory system of claim 4, wherein when the determined LBA access pattern indicates that a difference between the first LBA information and the second LBA information is equal to or more than a second value, the sequential index calculator determines that the LBA access pattern of the first LBA information and the second LBA information is a random pattern, and does not increase the sequential index.

7. The memory system of claim 4, wherein the sequential index calculator determines the LBA access pattern based on the first and second LBA information until the LBA information is written to all pages in the first memory block.

8. The memory system of claim 1, wherein the internal operation determining component stores the sequential index of the first memory block in a candidate list to perform the internal operation on the first memory block when the comparison result indicates that the sequential index of the first memory block is less than the threshold value.

9. The memory system of claim 8, wherein the candidate list stores one or more pieces of memory block information for performing the internal operation.

10. The memory system of claim 1, wherein the internal operation performing component checks LBA information having a lowest value among the pieces of LBA information stored in the first memory block, migrates the pieces of LBA information to the second memory block in ascending order of LBA information to sequentially rearrange the pieces of LBA information, and erases the pieces of LBA information stored in the first memory block.

11. An operating method of a memory system which includes a memory device that includes a first memory block and a second memory block, and a controller suitable for controlling the memory device, the operating method comprising:
   calculating a sequential index based on first logical block address (LBA) information and second LBA information that are written in the first memory block;
   determining whether an internal operation is to be performed on the first memory block, by comparing the sequential index of the first memory block with a threshold value; and
   migrating pieces of LBA information stored in the first memory block to the second memory block to rearrange the pieces of LBA information, when it is determined that the internal operation is to be performed on the first memory block,
   wherein the internal operation is performed when the comparison result indicates that the sequential index of the first memory block is smaller than the threshold value, and the internal operation is not performed when the comparison result indicates that the sequential index of the first memory block is equal to or greater than the threshold value.

12. The operating method of claim 11, wherein the first LBA information indicates information that is currently written in the first memory block.

13. The operating method of claim 11, wherein the second LBA information indicates information that is written before the first LBA information is written to the first memory block.

14. The operating method of claim 11, wherein the calculating of the sequential index includes determining a LBA access pattern based on the first and second LBA information written in the first memory block.

15. The operating method of claim 14, wherein when the determined LBA access pattern indicates that a difference between the first LBA information and the second LBA information is a first value, the LBA access pattern of the first LBA information and the second LBA information is determined to be a sequential pattern, and the sequential index is increased by a set unit value.

16. The operating method of claim 14, wherein when the determined LBA access pattern indicates that a difference between the first LBA information and the second LBA information is equal to or greater than a second value, the LBA access pattern of the first LBA information and the second LBA information is determined as a random pattern, and the sequential index is not increased.

17. The operating method of claim 11, wherein the sequential index is calculated based on the first LBA information and the second LBA information that are written to the first memory block until the LBA information is written to all pages in the first memory block.

18. The operating method of claim 11, wherein the determining of whether the internal operation is to be performed on the first memory block comprises storing the sequential index of the first memory block in a candidate list to perform the internal operation on the first memory block, when the comparison result between the sequential index of the first memory block and the threshold value indicates that the sequential index of the first memory block is smaller than the threshold value.

19. The operating method of claim 18, wherein the candidate list stores one or more pieces of memory block information for performing the internal operation.

20. The operating method of claim 11, wherein the migrating of the pieces of LBA information stored in the first memory block to the second memory block to rearrange the pieces of LBA information comprises checking LBA information having a lowest value among the pieces of LBA information stored in the first memory block, migrating the pieces of LBA information to the second memory block in ascending order of LBA information to sequentially rearrange the pieces of LBA information, and erasing the pieces of LBA information stored in the first memory block.

* * * * *